United States Patent

Mufti

[11] Patent Number: 6,055,329
[45] Date of Patent: Apr. 25, 2000

[54] HIGH SPEED OPTO-ELECTRONIC GAGE AND METHOD FOR GAGING

[75] Inventor: Asif Mufti, Long Beach, Calif.

[73] Assignee: Sherikon, Inc., Chantilly, Va.

[21] Appl. No.: 08/892,936

[22] Filed: Jul. 15, 1997

Related U.S. Application Data

[63] Continuation-in-part of application No. 08/591,104, Jan. 25, 1996, abandoned, which is a continuation of application No. 08/257,206, Jun. 9, 1994, abandoned.

[51] Int. Cl.[7] .............................. G06T 7/60; G01B 9/08
[52] U.S. Cl. ..................... 382/152; 382/286; 356/376; 356/387; 250/559.12; 250/559.24
[58] Field of Search ................................. 382/141, 142, 382/146, 152, 174, 286, 291; 348/92, 129, 130, 86; 356/376, 391–393, 237.1, 383–387; 250/559.2, 559.22, 559.24, 559.26, 559.12, 559.13, 559.14, 559.15

[56] References Cited

U.S. PATENT DOCUMENTS

| | | | |
|---|---|---|---|
| 3,806,251 | 4/1974 | Dandliker et al. | 356/111 |
| 3,941,484 | 3/1976 | Dreyfus | 356/156 |
| 4,121,294 | 10/1978 | Galanis et al. | 364/571 |
| 4,315,688 | 2/1982 | Pryor | 356/73 |
| 4,576,482 | 3/1986 | Pryor | 356/376 |
| 4,644,394 | 2/1987 | Reeves | 348/131 |
| 4,667,231 | 5/1987 | Pryor | 358/107 |
| 4,750,035 | 6/1988 | Chang et al. | 348/127 |
| 4,777,360 | 10/1988 | Carner, Jr. | 250/206.1 |
| 4,823,396 | 4/1989 | Thompson | 382/152 |
| 4,828,159 | 5/1989 | Woods | 227/156 |
| 4,872,757 | 10/1989 | Cormack et al. | 356/376 |
| 5,015,867 | 5/1991 | Siegel et al. | 250/560 |
| 5,047,861 | 9/1991 | Houchin et al. | 358/213.15 |
| 5,114,230 | 5/1992 | Pryor | 356/372 |
| 5,150,623 | 9/1992 | Woods | 73/865.8 |
| 5,278,634 | 1/1994 | Skunes et al. | 356/400 |
| 5,327,217 | 7/1994 | Kanai et al. | 356/353 |
| 5,559,727 | 9/1996 | Deley et al. | 364/559 |
| 5,753,905 | 5/1998 | Ringlien | 250/223 B |
| 5,897,611 | 4/1999 | Case et al. | 702/150 |
| 5,953,126 | 9/1999 | Zavislan | 356/376 |

FOREIGN PATENT DOCUMENTS

| | | |
|---|---|---|
| 5-249048 | 9/1993 | Japan . |
| 2007836 | 5/1979 | United Kingdom ............ G01B 11/08 |

OTHER PUBLICATIONS

Raymond A. Serway et al., College Physics, Second Edition, Saunders College Publishing, p.p.787–789, ISBN 0–03–022952–9, 1989.

Primary Examiner—Leo H. Boudreau
Assistant Examiner—Brian P. Werner
Attorney, Agent, or Firm—Foley & Lardner

[57] ABSTRACT

An method and apparatus for determining deviation of characteristics of a sample workpiece from predetermined characteristics of a control workpiece. The apparatus preferably includes an illumination system for producing a collimated beam having substantially parallel rays, a positioning system for placing a sample workpiece between outer edges of the collimated beam so that the sample workpiece partially occludes the collimated beam to produce a silhouette within the collimated beam, an imaging apparatus oriented normal to said collimated beam and including a plurality of discrete light sensing elements for producing pixel data representative of an image including the silhouette, and a processor for determining deviation of characteristics of the sample workpiece from predetermined characteristics of a control workpiece using the pixel data according to pixel data representative of a diffraction band generated through interaction of the sample workpiece and the collimated beam. A preprocessor for preprocessing the pixel data to compensate for imaging defects and for normalizing the diffraction band may also be included.

7 Claims, 5 Drawing Sheets

HIGH SPEED OPTO-ELECTRONIC GAGE AND METHOD FOR GAGING

RELATED APPLICATIONS

This application is a continuation in part of U.S. Ser. No. 08/591,104, filed on Jan. 25, 1996, now abandoned, which is a continuation of U.S. Ser. No. 08/257,206, filed on Jun. 9, 1994, now abandoned, the entireties of which are incorporated herein by reference.

BACKGROUND OF THE INVENTION

1. Field of the Invention

The invention pertains to the field of quality control of fasteners and other fabricated components. The invention addresses the problem of providing rapid determination of component acceptability using a component imaging system.

2. Brief Description of Prior Art

In the fastener art, the quality of individual fasteners may be assessed through analysis of fastener characteristics such as shank diameter, perpendicularity, and eccentricity, as well as certain specific thread measurements such as minor and major diameter, thread pitch, pitch diameter, flank angle, length of thread engagement and the like. By comparing the actual characteristics of a fastener to maximum and minimum tolerances for each of its characteristics, the quality of the fastener may be determined.

However, the degree to which such quality control is practical depends on the time required to make these assessments. Conventional technology requires at least one minute to accurately gage a fastener's dimensions. Using conventional technology, it is necessary to make tradeoffs between quality assurance measurement and production speed, for example by taking fewer than all the measurements that would be advantageous from a quality assurance standpoint, or by sampling individual fasteners and generalizing the characteristics of that fastener to all fasteners from the same production batch.

One approach to determining fastener quality involves generating an image of a sample fastener and analyzing the image using a computer. The teachings of certain relevant prior art documents and other conventional knowledge in the field is now briefly reviewed.

U.S. Pat. No. 3,941,484—Dreyfus, discloses backlighting an object by use of a laser and a collimating lens or mirror that expands the point source laser light to encompass an object to be examined. The object partly occludes the expanded beam and provides an image. Additional lenses concentrate the beam at a point or scanning tube arrangement, such that the luminance of the collected light is serialized like a raster image. The serial luminance level is sampled repetitively in conjunction with a threshold comparator and timing means to locate the edge of the object from a change in the amplitude of the luminance signal. The comparator data, in connection with timing data, can be converted into a dimensional measurement. This scanning arrangement is inherently serial, and as a result, the scanner can sense light intensity from the beam at only one position at a time. Timing considerations affect the accuracy of the measurement. Moreover, the system is prone to error if applied to moving parts.

U.S. Pat. Nos. 4,576,482 and 5,114,230, both to Pryor, disclose systems in which a collimated laser light is used as a back-light to collect luminance information by finding the transition in luminance across a single edge of an object. The light is partly occluded by the object and is applied to a linear photodiode array having an extension perpendicular to the edge. The object can be a cam or the like that is rotated in conjunction with the measurement to define the contour of the cam surface. The Pryor technique is also serial in that it detects the luminance transition along a line. The collimated beam is not wide enough to profile both edges of the object simultaneously. Furthermore, an array is not used to detect the resulting silhouette.

U.S. Pat. No. 4,315,688—Pryor discloses utilizing reflected light rather than an occluded backlight source, to check the quality or at least presence of fastener threads. Reflected light typically produces low accuracy measurements when used to gage fastener dimensions. An image of a portion of the threads of a fastener is created on a single sensor and the output signal is analyzed to determine thread quality.

Thread quality gaging is a particularly demanding imaging problem that has not been solved completely by digital imaging methods, especially where use of a lens is involved. Conventional technology requires accurate positioning of the focusing lens a certain distance from the object being measured in order to produce a silhouette identical in size to the object.

U.S. Pat. 4,644,394—Reeves discloses a system for examining external threads on a pipe using a collimated laser beam to back-light the threads along one side of the pipe. A luminance transition thus is detectable at a tangent of the pipe surface. An image of the pipe threads at one angular point on one side of the pipe is collected and processed and enables certain thread measurements in that area. However, in order to make related thread measurements at other angular points around the pipe, for example to determine pipe diameter or to relate thread data in different areas, it is necessary to rotate the pipe or to move the camera around the pipe axis while keeping the collimated source aligned to the camera. A metered rotation drive means can be used to rotate the pipe or to orbit the camera and source, so as to enable the data applicable to different points along the threads to be correlated. However, system accuracy is highly dependent upon the rotation drive means and the ability to accurately position the part at different angular positions with respect to the rotation axis. These requirements introduce time constraints and measurement inaccuracies.

Three patents assigned to the Boeing Company (U.S. Pat. Nos. 5,150,623, 4,828,159 and 4,823,396) disclose digital imaging methods which utilize back lighting to gage fastener dimensions. U.S. Pat. No. 4,823,396—Thompson discloses a method in which a fastener is back-lit by an array of LED's (light emitting diodes). A video image is created of the fastener profile, which is then digitized and processed to verify thread presence, discriminate between fasteners with helical and parallel threads, measure thread length and perform various dimensional measurements on the head and shank of the fastener. The accuracy of the measurements performed is dependent on the distance between the camera lens and the fastener. Without collimated back lighting, slight variations in distance generate variations in image feature size and consequently measurement errors. Such uncertainties are significant when fasteners must be dimensioned to within tight tolerances, for example for use in the aerospace industry.

U.S. Pat. Nos. 4,828,159 and 5,150,623 both issued to Woods, disclose methods which attempt to remedy the above problem by using two cameras, imaging the fastener from two orthogonal directions and mathematically calculating the position of the fastener at the time of imaging. The calculation of precise fastener position is dependent upon precise focussing of the cameras. Minute focusing errors generate errors in the calculated position, and hence in the detected fastener dimensions.

It is known to collect and analyze a two dimensional image of an object by opto-electronic methods employing digital video imaging means, and in particular to perform dimensional measurements. In conventional systems, an image of an object or its profile is focused on a two dimensional detector array such as that of a video camera. The image is digitized, often together with conventional image enhancement techniques intended to produce better edge contrast. A computer or other electronic processing device processes the digital information to locate edges and other relevant image points by finding transitions in luminance. Various object dimensions are then determined from the pixel position displacements between transitions in luminance. With a proper setup, measurements can be made quickly and accurately, even of objects moving rapidly on an assembly-line conveyor. The accuracy of the measurements performed with such methods is limited by several factors, including the fidelity of the input image, the manner of illumination, the imaging optics, the detector, and the placement of the object to be measured.

SUMMARY OF THE INVENTION

The invention eliminates the problems inherent in conventional fastener evaluation devices through the use of a collimated beam of light generated by a laser light source and associated optics which is directed normal to an imaging array. The beam is occluded by a workpiece to produce a silhouette within the collimated beam, and the imaging array produces image data representative of the collimated beam including the silhouette of the workpiece. A processor determines deviation of characteristics of the sample workpiece from predetermined characteristics of a control workpiece using the pixel data generated by the imaging means and specifically using pixel data representative of a diffraction band generated through interaction of the sample workpiece and the collimated beam. A preprocessor for preprocessing the pixel data to compensate for imaging defects and for normalizing the diffraction band may also be included.

Accordingly, an object of the invention is to provide a non-contact means for gaging the quality of a plurality of fasteners.

A further object is to provide a video imaging method and device in which variations in fastener positioning with respect to the detector array have minimal impact upon fastener dimension measurements.

Another object is to minimize labor-related errors by providing an apparatus and method which are simple to use and involve a minimum of component parts.

A further object is to provide a method and apparatus which do not suffer from the measurement uncertainties created by an out of focus image or an image degraded by lens aberrations introduced through the use of an imaging lens.

Another object is to provide a method for measuring fastener dimensions that can be standardized and that will lend itself to the inspection of fasteners at the speed necessitated by high speed production methods.

A further object is to improve the accuracy and speed of fastener measurements by simultaneously collecting pixel data representing a collimated beam including a full silhouette of an object illuminated by the beam, whereby dimensions can be determined directly from the pixel data.

It is a further object to provide video image collection and analysis for rapid gaging of the dimensions of workpieces such as fasteners comprising threaded screws or bolts, using collimated laser imaging techniques to obtain a precise two dimensional pixel image, subject to data analysis, whereby precise measurements are taken from a pixel image silhouette of the workpiece.

The invention preferably employs a non-contact method and apparatus for gaging dimensions of a workpiece for production reporting, quality assurance, selection/rejection decisions and the like. Dimensions are determined rapidly and to high accuracy by using customized software developed in accordance with the particular application of the inventive system and methods. A workpiece, for example, a fastener, whose dimensions are to be determined is preferably positioned by mechanical means immediately opposite a two dimensional solid state detector array such as the kind used in CCD or CID cameras. The fastener can be positioned, for example, by means of a vacuum chuck or conveyor bracket, so that the fastener is disposed in a known orientation. Alternatively the fastener may be manually positioned. The fastener is back-illuminated by a collimated laser beam which impinges on the detector array at normal incidence, providing parallel light rays oriented perpendicular to the longitudinal axis of the fastener. The laser beam is expanded by collimating means to encompass at least two opposite edges of the fastener simultaneously. The fastener occludes or eclipses part of the beam, thereby producing a silhouette of the fastener. Due to the collimation of the beam the silhouette can be cast on the detector array without the use of an intermediate focusing lens.

It is an aspect of the invention that by use of collimated laser back-lighting for creation of a silhouette without the use of an imaging lens, and employment of a high precision CID detector array to parallel load a silhouette image spanning opposite sides of workpieces, a fast and efficient means and method for automatic workpiece inspection is provided. Inspection of each workpiece may be accomplished in as little as one second.

Use of a highly collimated beam for back-lighting according to the invention provides several advantages over prior art methods. The technique provides greater latitude in fastener placement. It minimizes the effects of minor changes in the distances between the fastener and the light source and detector array, thereby reducing the time for evaluation of the fastener. It also permits variation in the orientation of the fastener with respect to the detector array, which array is sized to encompass the silhouette such that accurate dimensions are quickly and readily obtainable from the pixel image data. It is possible to collimate a beam of laser light so that the angular divergence of parallel rays is as small as 1 arc-second. When an object is back-lit with such a beam, a 1cm variation of the displacement of the object from a position 10 cm from the detector array translates geometrically to only a 5 millionths of a centimeter change in the size of the silhouette produced on the array. This is about one-tenth the wavelength of the light and is inconsequential in comparison with errors introduced by diffraction effects and from other sources.

Image data representative of the silhouette may be generated in a strobe fashion. This provides for the possibility of rotating a single workpiece in place and taking images of various edge profiles, for example at regularly spaced angular positions around a longitudinal axis of the workpiece.

However, each of the profiles can provide full lateral measurements. Slight displacements of the light/dark transitions in the successive silhouettes, including displacements due to rotation, have minimal effect on the silhouette or the measurements available by processing the image data. Finally, use of a highly collimated laser beam for back-lightning in conjunction with a two dimensional imaging array such as a CID or CCD detector array ensures a precise, essentially one-to-one correspondence between a workpiece and its silhouette. A highly collimated laser beam illumination source also minimizes grazing edge reflections which can make precise edge location difficult and hence degrade measurement accuracy.

Additional advantages are provided according to the preferred means for creating silhouette of the workpiece, wherein no imaging lens is provided between the workpiece and the detector array for focusing the image. Measurement errors resulting from image degradation due to lens aberrations are eliminated. Since no focusing is required, workpieces of different sizes can be inspected with little or no adjustment to the setup. Since a full width silhouette of the workpiece is incident on the detector array, with or without the use of a condenser, the diameter measurement errors that would be inherent in metered rotation and/or successive illumination of opposite edges with independent beams or with the same beam at different times, are avoided. By thus eliminating the need for precision workpiece placement and the use of an imaging array normal to the collimated beam, the inspection procedure and mechanical requirements are considerably simplified. The invention thus makes possible a more compact and less expensive setup.

Since there is no imaging lens in front of the imaging array, diffraction effects are minimized by placing the workpiece as close as possible to the imaging array. For this reason the thickness of the transparent plate placed in front of the imaging array is preferably minimized. The transparent plate is preferably scratch resistant, resistant to breakage under mechanical impact and coated with an anti-reflective coating corresponding to the laser beam. The procedure requires that once the collimated beam is incident on the two dimensional array the workpiece, whose dimensions are to be determined, occludes the collimated beam. Diffraction effects are minimized by placing the workpiece immediate to the transparent plate and hence to the imaging array.

The imaging array can comprise light sensitive charge-coupled devices (CCD) or charge-injection devices (CID). Preferably, however, a CID array is used. Such an array has the advantage that its individual sensing elements are arranged contiguously, with no space between adjacent pixels. This makes possible the precise location of the object edges to within 15 microns in the pixel image. In addition, since each CID pixel is individually addressed, the x,y coordinates of each edge point can be accurately determined using direct data processing steps. Finally, CIDs provide improved accuracy because they are immune to the "blooming" or streaking problems to which CCDs are subject when high intensity light source such as lasers are employed for fast imaging purposes. Although CCD arrays have recently been introduced which have contiguously arranged pixels and are resistant to "blooming", such CCD arrays are expensive as compared to CIDS.

CID and CCD detector arrays are known to increase in cost as array area is increased. Often the cost of a single detector array exceeds the cost of two detector arrays which are half its size. It is preferable, therefore, to use a detector array having a relatively small area. Occasionally, a workpiece will have a dimension exceeding one or both of the height and width of the detector array. In such cases it is possible to employ two small detector arrays in a side-by-side arrangement to gage the over-sized fastener. In cases where the fastener has, for example, a width greater than the combined width of side-by-side arranged arrays, the arrays may be separated from each other as necessary to ensure that the Mar edge of each array is set-out from a respective edge of the fastener. The pixels of the arrays are appropriately re-addressed through the software. The system can be calibrated by placing a high precision ruler in the path of the collimated beam to cast a silhouette on both detector arrays simultaneously. The data obtained is compared to the actual dimensions and adjustments made as necessary to the array positioning or addressing. Alternatively, a telecentric lens may be placed between the object and the imaging array to shrink the silhouette without disturbing the collimation of the surrounding beam.

It is further desirable to provide preprocessing of image data to compensate for systematic imaging errors and errors associated with the type of workpiece being analyzed. Preprocessing may include compensation for dark noise of the imaging array, variance in light intensity across the array, and diffraction errors which are dependent of the material of the object being imaged.

These objects and other objects and advantages of the invention will be further apparent in connection with the following description of certain preferred embodiments of the invention and the accompanying diagrams.

BRIEF DESCRIPTION OF THE DRAWINGS

There are shown in the drawings examples of embodiments of the invention as presently preferred. It should be understood that the invention is not limited to the precise structures and arrangements shown in the drawings, wherein.

DETAILED DESCRIPTION OF THE PREFERRED EMBODIMENTS

Figure 1:
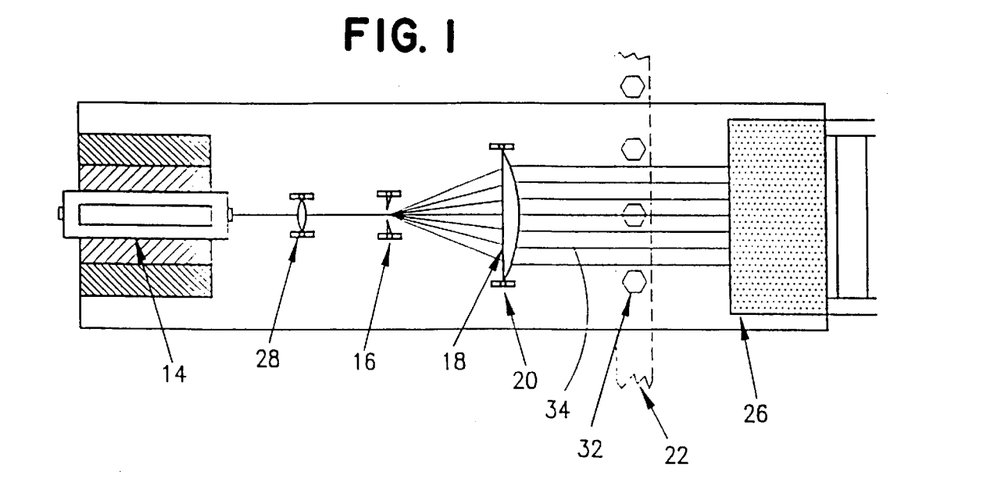
FIG. 1 is a top plan view of a device in accordance with the invention.
Figure 2:
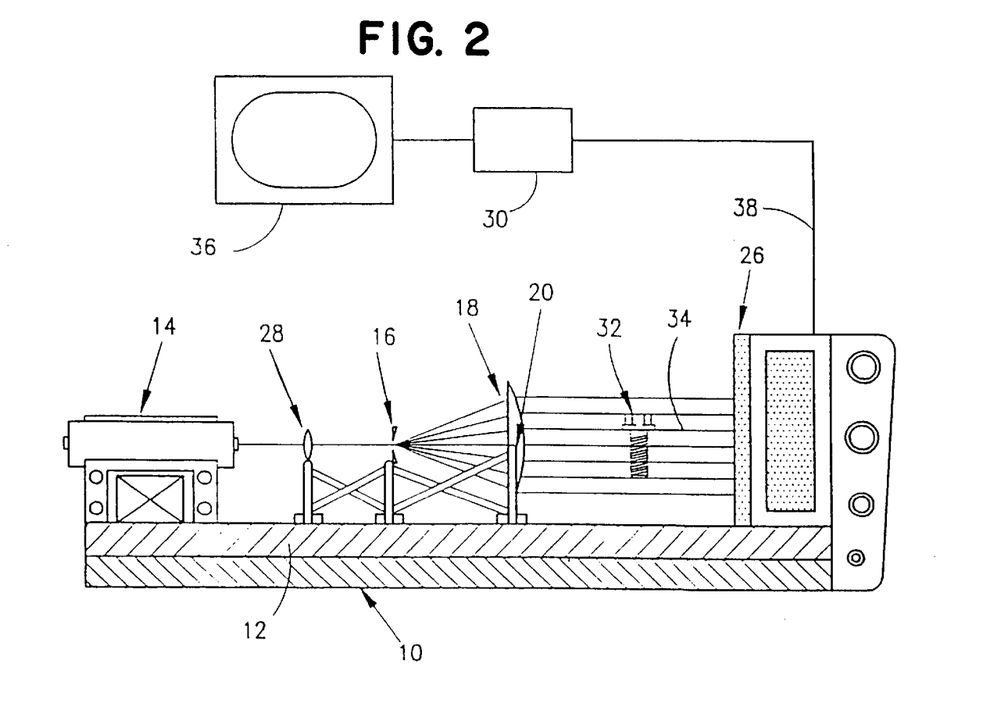
FIG. 2 is a partly schematic side elevation view of the device of FIG. 1.
Figure 3:
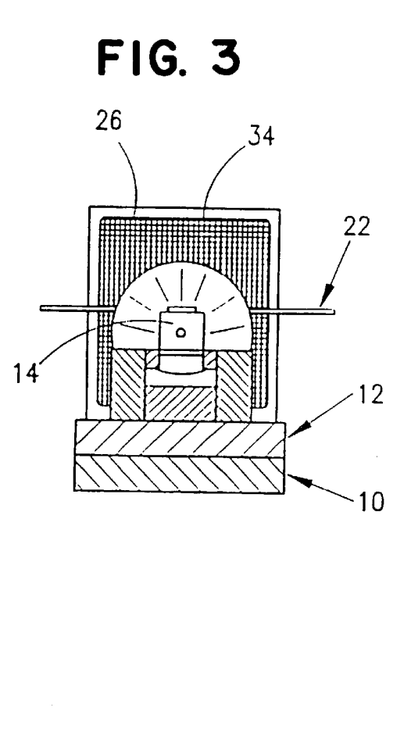
FIG. 3 is an end elevation view in the direction of illumination of the device of FIG. 1.

FIGS. 1 through 3 slows a preferred embodiment of a workpiece inspection system according to the invention. The system includes a steel plate 12, which can be disposed on a base vibration isolation system 10 for preventing vibrations from a conveyor or other workpiece transporting device from being communicated to the measurement system. A laser light source 14 is mounted on plate 12 at one end such that the beam axis is aligned with the longitudinal center line of the plate 12. Also mounted on plate 12 and positioned along its center line are optical components for removing fluctuations from the intensity profile of the beam and for expanding and collimating the laser beam. In order to increase the distance from the laser, an objective lens 28 focuses the laser beam through the aperture of a pinhole in shade 16. A lens mount 20 and a plano-convex lens 18 are preferably used to collimate the laser beam. Collimating plano-convex lens 18 is normal to the optical axis, and is precisely spaced along the optical axis from pinhole shade 16 by a distance equal to the focal length of lens 18. Accordingly, the rays from the laser are aligned by lens 18 to be parallel to one another and to the optical axis, over a height and width that is larger than the height and width of the workpiece or part of the workpiece 32 to be imaged and measured.

A planar solid state imaging array 26 is disposed behind the workpiece 32 and due to the parallel alignment of the beam rays receives a sharp silhouette of the workpiece regardless of precisely where the workpiece is located along the optical axis. In applications in which the object to be imaged is sufficiently small to fit within the edges of the imaging array, no lens is provided in front of the imaging array 26. Alternatively, where a workpiece is larger than the imaging array, a telecentric lens may be placed between the workpiece and the imaging array to reduce the size of the collimated beam and hence of the silhouette. In either case, the aperture of the pinhole 16, collimating lene 18, and imaging array 26 are oriented such that the axis and center of each lie along a line defined by the light propagation axis of the laser beam. The imaging array 26 is normal to this axis.

A fastener positioning system 22 positions the workpiece 32, in this case a threaded bolt, in the path of the collimated beam 34, between the lens 18 and the imaging array 26. A processor 30 and preferably a display monitor 36 are coupled to the imaging array 26, for example by cable 38, such that an intensity signal for each sensor of the imaging array 26 is provided to the processor.

In operation the laser 14 produces a narrow beam of light which impinges upon the objective lens 28 and is focussed through the pinhole aperture of shade 16 which is located at the focal point of plano-convex lens 18. The objective lens 28 and pinhole 16 act to provide a point light source for the plano-convex lens 18. The beam emerging from the pinhole of the shade 16 diverges radially from the pinhole. A portion of the light is intercepted by plano-convex lens 18, which refracts the light rays by an amount that is a function of their angles of incidence on the air/glass boundaries at the surfaces of lens 18. The laser beam is thereby collimated.

The distance between the pinhole 16 and the plano-concave lens 18, and the area of lens 18, are determined with respect to the area of the imaging array 26, and preferably are chosen such that the collimated beam has a width substantially corresponding to the receiving area of the imaging array 26. The rays of the collimated beam which emerge From the lens 18 are parallel to the optical axis of the lens and normal to the plane of the imaging array 26. Between the plano-convex lens 18 and the imaging array 26, a collimated beam 34 with divergence of 1 arc second or better can be produced.

Figure 4:
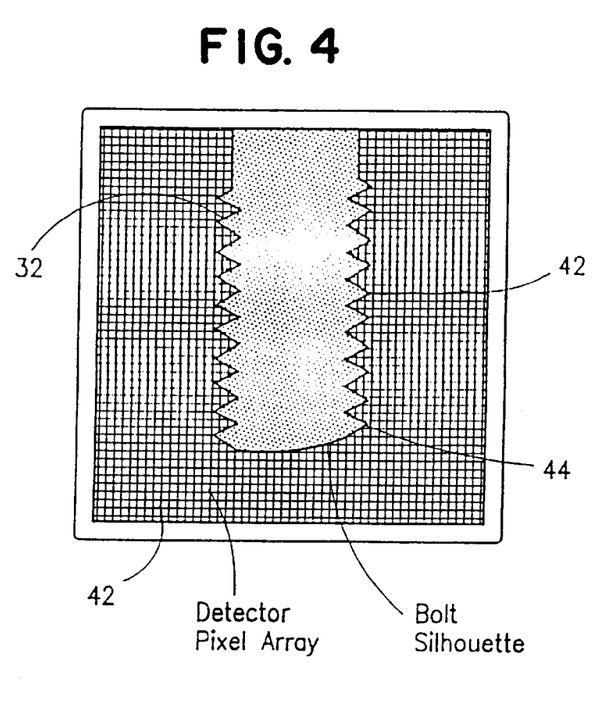
FIG. 4 is a front plan view of a silhouette image on a detector array as produced by a device in accordance with the invention.
Figure 5:
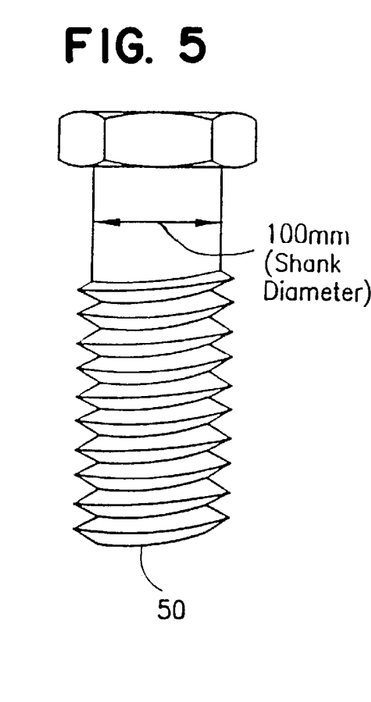
FIG. 5 is an elevation view of a fastener as imaged according to FIG. 4.

A work piece to be inspected, for example a fastener, is preferably suspended from the positioning system 22, for example via a vacuum chuck, with its axis within a few degrees of vertical. The fastener is positioned so that it lies entirely within the collimated beam, and occludes part of the highly collimated laser beam 34 to produce a dimensionally precise silhouette on the imaging array 26. FIG. 4 shows the silhouette image 44 superimposed over the sensors 42 of the imaging array 26. As shown in FIG. 4, the silhouette 44 has dimensions corresponding to those of the imaged fastener, which is shown in FIG. 5.

Figure 6:
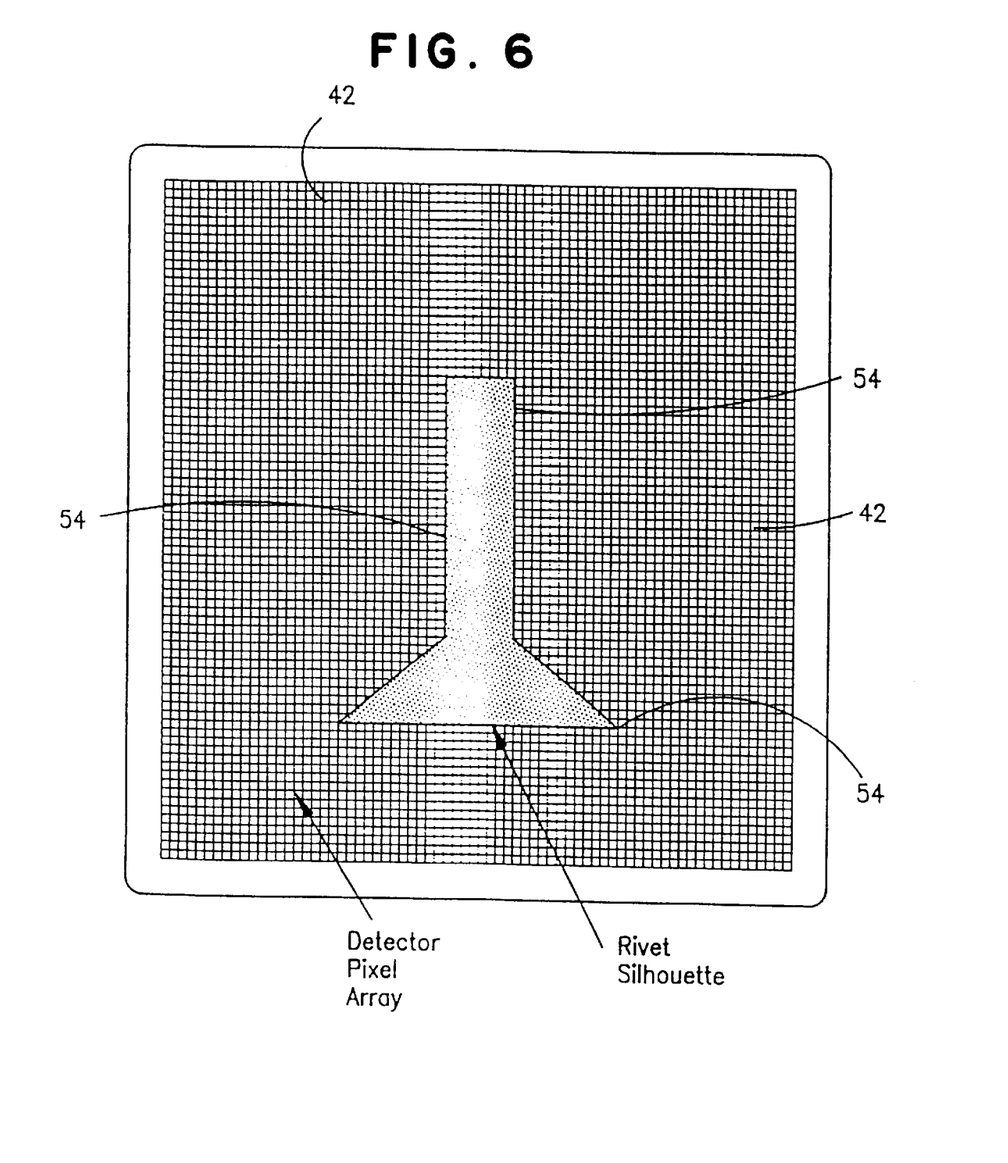
FIG. 6 is a front plan view of a silhouette image on a detector array as produced by the device of the invention.

FIG. 6 shows a silhouette image 54 of a rivet superimposed on a pixel matrix 42 of the imaging array 26. The dimensionally precise silhouette 54 of the rivet is cast upon the individual sensors 42 of the imaging array. Each sensor corresponds to a pixel of an image of the collimated beam and silhouette generated by the imaging array.

The processor 30 includes means for addressing the sensors of the imaging array 26, an analog to digital converter (not shown), and associated timing means. The processor may be triggered to commence an imaging cycle whenever a workpiece 32 is placed in the field of view. The processor may further collect a series of images of the workpiece in strobe fashion as the workpiece is rotated in successive positions by the positioning system 22. These functions may be provided through appropriate programming of the processor in accordance with the conventional manners of automated positioning and imaging systems.

During imaging, the sensors of the imaging array operate to provide a matrix of grey scale intensity signals at uniformly distributed points within the occluded beam. These signals are converted by the A/D convertor to pixel data representative of the occluded beam. Subsequent analysis of the pixel data by the processor allows a determination of the characteristics of the workpiece represented in its silhouette.

The characteristics of an imaged workpiece are determined through analysis of the dimensions of the edges of the workpiece. Determination of the edge dimensions of a workpiece are made through analysis of image data and with reference to known dimensions of a control workpiece. A preferred manner of determining edge dimensions is now described.

As noted above, image data effectively provides a matrix of grey scale intensity values corresponding to sensor output signals for an image of the occluded collimated beam. Occlusion of the collimated beam by a control workpiece will accordingly produce a pattern of intensity values which is a function of the dimensions of the control workpiece. In particular, the pattern of intensity values will include a diffraction band adjacent the edge of the silhouette. While the dimensions of the diffraction band are not equal to the dimensions of the edge of the associated workpiece, its dimensions are fixed relative to the dimensions of the workpiece. Accordingly, the position of the diffraction band of an imaged fastener may used to determine the dimensions of the fastener itself. This is accomplished by imaging a control workpiece of known dimensions, determining the spatial dimensions of the band of maximum intensity within the diffraction band, and calculating the offset of the diffraction band compared to the dimensions of the control workpiece. This offset may then be applied to images generated for sample workpieces of the same type to determine the dimensions of the sample workpiece. The data describing the offset for a workpiece of a particular type will be referred to herein as the control data.

Figure 7:
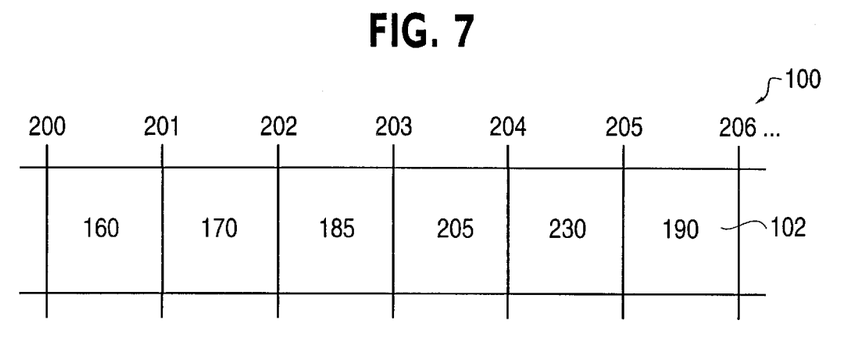
FIGS. 7 and 7A illustrate light intensities at sensing elements used for edge detection.
Figure 7A:
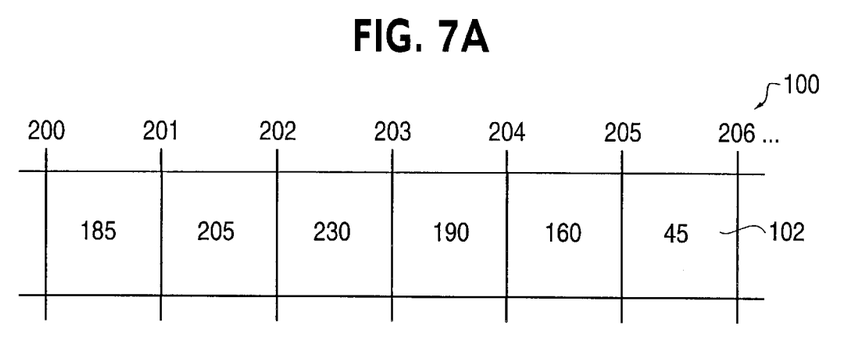

An example the generation and use of control data is provided by the following description in conjunction with the illustrations of FIGS. 7 and 7a. As shown in FIG. 7, a portion of an imaging array 100 includes a continuous array of square sensors 102 having a length of 10 microns (0.010 mm) on each side, allowing spatial positions of points within images to be determined accurately to 10 microns. A control fastener having a width of 2 mm along the horizontal line of the illustrated sensors produces a diffraction band, a portion of which has grey scale intensities at sensors along the horizontal line as illustrated. The diffraction band includes a maximum grey scale intensity of 230 at sensor 204 of the array. Through analysis of the pixel data of the image of the control-workpiece it is determined that the diffraction band of the control workpiece has a width between its maxima along the horizontal line of 2.060 mm. It is therefore determined that the diffraction band of a fastener of that type is off set 0.030 mm outward from the "true" edge of a fastener of that type.

Subsequently, a sample fastener is imaged and a diffraction band as illustrated in FIG. 7a is produced having grey scale intensities as illustrated in FIG. 7a. The maximum of the diffraction is located at sensor 202. By applying the offset, the true edge of the sample fastener can be positively located 0.030 mm inward from sensor 202.

It will be appreciated that an analogous process may be used to determine the vertical offset of the diffraction band from the true dimensions of the control fastener and any subsequently imaged sample fastener. Thus, by determining the spatial locations of diffraction band maxima corresponding to various points of interest on the periphery of the sample fastener, the relative spatial locations of the true edges of the fastener may be determined and characteristics of the fastener may thereafter be determined.

Figure 8:
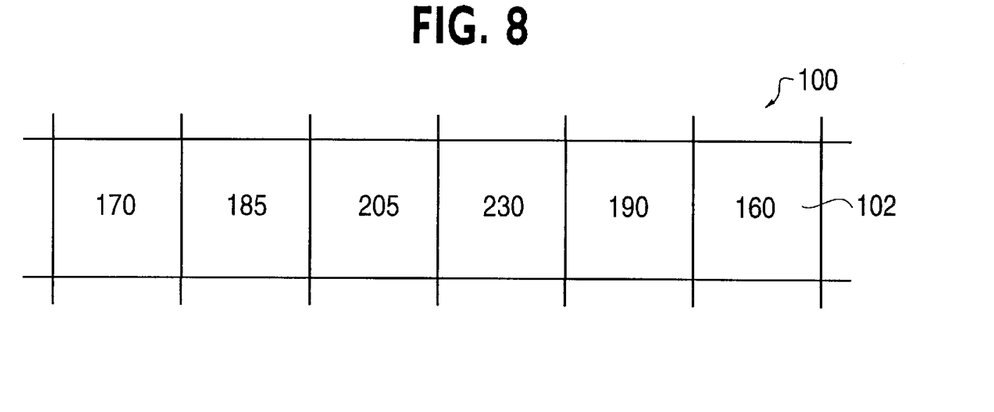
FIGS. 8 and 8A illustrate light intensities at sensing elements used for interpolative edge detection.

It may be necessary to determine workpiece dimensions in units which are smaller than the basic imaging array sensor unit size. For example, the industry standard unit of tolerance in the field of fasteners is 0.0025 mm (2.5 microns), however as described above, the standard sensor unit size is 0.010 mm (10 microns). Accordingly, an interpolative process may be employed to provide measurements in units less than the sensor unit size. An example of an interpolative process in the context of a system in accordance with the invention is provided by the following description in conjunction with the illustrations of FIGS. 8 and 8a. FIG. 8 shows a sensor array 100 and intensities of a diffraction band of a control fastener sensed at each sensor 102 of the array. It is again assumed that the sensors measure 0.010 mm square. It is further assumed that it is desired to determine the dimensions of fasteners of this type to an accuracy of 0.001 mm (1 micron).

Figure 8A:
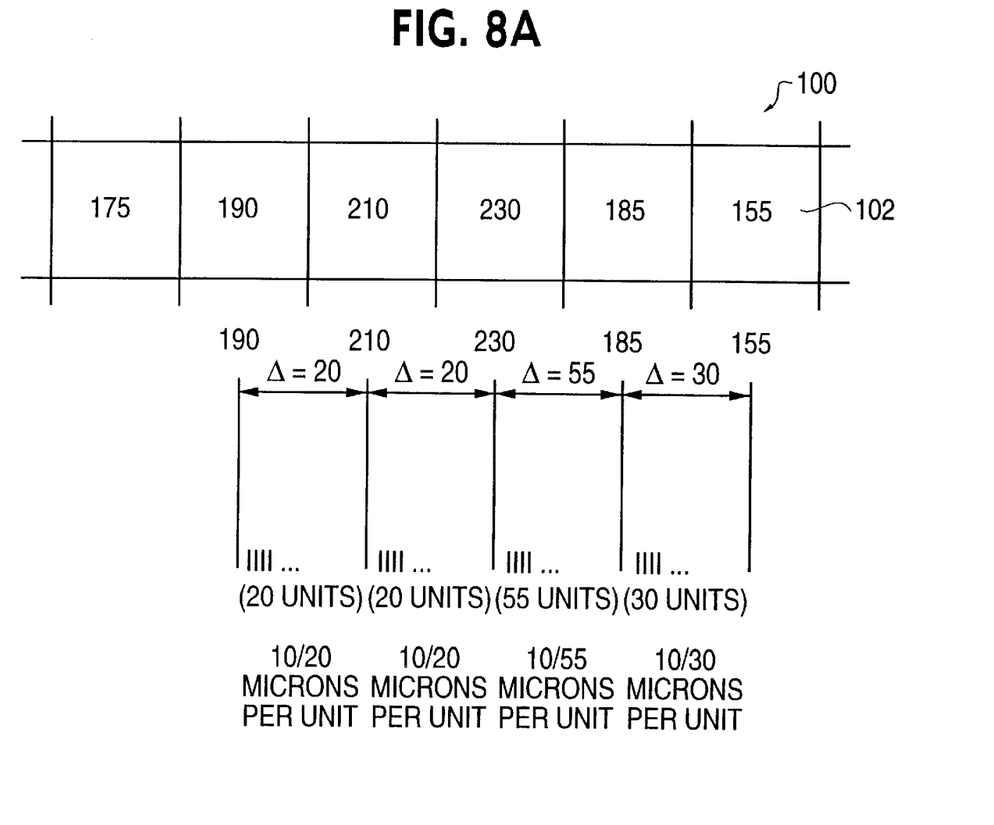

Accordingly, as shown in FIG. 8a, an interpolative process is used. In accordance with this process, the center point of each sensor is designated as a position having the intensity which is sensed by the sensor as a whole. Subsequently, the difference in intensities in grey scale units between adjacent pixels is determined, and the space between each center point is divided into an equal number of units corresponding to the change in intensities between the two center points. Using the scale thus created, the intensity at the unit which corresponds in spatial position to the true edge of the control workpiece is determined. This intensity is thereafter taken to correspond in position to the true edge of the imaged workpiece. Accordingly, when a sample workpiece is later imaged, its sensor readings are similarly subdivided to determine the unit having the intensity which is representative of the true edge of the workpiece.

To enhance the accuracy of dimensional measurements, image analysis may be preceded by preprocessing steps which alter the pixel data to compensate for systematic imaging errors or which normalize the pixel data in accordance with known properties of the imaged workpiece. Image preprocessing may be critical to providing accurate measurement and inspection where workpiece tolerances are narrow. Systematic errors which may be compensated through preprocessing include dark noise errors associated with each pixel and image intensity deviations inherent to the collimated beam. Normalization may be provided to adjust the grey scale intensities of pixels within a diffraction band having a maximum intensity which is different than that produced by the control workpiece.

Dark noise preprocessing comprises altering the pixel data associated with each pixel of raw image pixel data to compensate for dark noise errors inherent to each of the individual sensor of the imaging array. Dark noise preprocessing may be accomplished through the use of dark noise compensation data representing the dark noise component of each sensor of the imaging array. Dark noise compensation data may be obtained by monitoring the output signals of the imaging array under dark conditions. Under dark conditions, each pixel of the imaging array will produce an intensity signal which fluctuates within a range. The dark noise compensation data preferably comprises an average dark noise intensity value for each sensor of the imaging array. Accordingly, preprocessing of raw pixel data for an occluded beam image may comprise altering the data for each pixel by subtracting the dark noise intensity value associated with that pixel from the raw image intensity measured at that pixel. This function may be performed by the processor in accordance with appropriate programming instructions.

Intensity compensation comprises altering the pixel data associated with each pixel of raw image pixel data to compensate for variations in illumination intensity which are inherent to the collimated beam. Intensity compensation preprocessing may be accomplished through the use of intensity compensation data representing, for example, an average deviation in beam intensity from an average beam intensity at each sensor of the imaging array. Intensity compensation data may be obtained by imaging the collimated beam while unoccluded. Under such exposure, each sensor of the imaging array will produce an intensity signal which fluctuates within a range. The intensity-compensation data preferably comprises an intensity deviation value for each image pixel representing the deviation of the average intensity at the corresponding sensor from an average intensity value for the collimated beam. Accordingly, preprocessing of raw pixel data for an occluded beam image may comprise altering the data for each pixel by subtracting the intensity deviation value associated with each pixel from the raw image intensity measured at that pixel. This function may be performed by the processor in accordance with appropriate programming instructions. It will be appreciated that since intensity deviation is a characteristic of the collimated beam, the intensity compensation data for each pixel will be accurate only when the alignment of the collimated beam and the imaging array is the same as it was when the intensity compensation data was generated. Accordingly, it is desirable to update intensity compensation data upon any significant alteration in alignment.

It will be further appreciated that it is preferable to perform both dark noise compensation and intensity compensation prior to further analysis of image data. Each of these preprocessing functions provides an improvement in image data which is independent of the other function, and so either function may be performed prior or subsequent to the other.

Preprocessing may further include diffraction band normalization. Referring to the edge detection process discussed above, it will be apparent that a difference in the maximum diffraction band intensities of a control workpiece and a sample workpiece could lead to erroneous edge detection. A difference in these intensities may result from a difference in placement of the true edge of the workpiece with respect to the edges of the individual sensor elements, causing the diffraction band to be aligned slightly differently and to produce slightly different intensity readings. Alternatively, a sample workpiece may be formed of a different material than the control workpiece of its type, leading to the generation of a diffraction band having the same pattern but significantly different intensities. Accordingly, it is desirable to normalize the pixels of the diffraction band prior to performing edge detection.

Diffraction band normalization may be performed simply by determining a maximum intensity for the diffraction band of the control workpiece and the diffraction band of the sample workpiece. The difference between these intensities may thereafter be either added or subtracted, as appropriate, from the pixels of maximum intensity of the diffraction band of the sample workpiece, and from a predetermined number of pixels (e.g. 2 or 3) bordering the pixels of maximum intensity. In this manner each diffraction band has an equal maximum intensity, and edge detection based on the spatial location of a particular grey scale intensity may be performed.

The inspection system thus described can dependably determine pertinent dimensions of fasteners such as bolts, screws and the like, compare the measurements to selection criteria, and operate selection/rejection actuators, all at production speeds. These dimensions used to select or reject can include pitch diameter, flank angle, major diameter, minor diameter, thread height, thread pitch, shank diameter, length of thread engagement, fastener perpendicularity and the like. It will be appreciated that other dimensions may also be pertinent with respect to fasteners or parts of a different character.

The invention has been described with respect to certain preferred embodiments but is subject to variation within the scope of the appended claims. Reference should be made to the following claims rather than foregoing specification as indicating the true scope of the invention in which exclusive rights are claimed.

What is claimed is:

1. An apparatus for determining deviation of characteristics of a sample workpiece from characteristics of a control workpiece, comprising:
   an illumination system for producing a collimated beam having substantially parallel rays;
   a positioning system for placing the sample workpiece between outer edges of said collimated beam to produce a sample image including a silhouette of the sample workpiece;
   an imaging array, normal to said collimated beam and comprising a plurality of discrete light sensing elements, for producing signals corresponding to intensities of pixels of said sample image including said silhouette; and
   a processor for producing pixel data corresponding to said signals and for determining dimensions of the sample workpiece by:
   determining a diffraction band produced by edges of said sample workpiece and having an intensity of a diffraction band of a control image produced by edges of a control workpiece of the same type as the sample workpiece;
   determining a sample distance between points located within said diffraction band of said sample image;
   determining a control distance between corresponding points located within the diffraction band of the control image;
   determining an offset between said control distance and a known distance between corresponding points of the control workpiece; and
   applying the offset to said sample distance.

2. The apparatus of claim 1, wherein said processor provides the further function of preprocessing said pixel data.

3. The apparatus of claim 2, wherein said preprocessing comprises correcting in said pixel data dark noise errors associated with said light sensing elements.

4. The apparatus of claim 2, wherein said preprocessing comprises correcting in said pixel data intensity deviation errors occurring at each of said light sensing elements.

5. The apparatus of claim 2, wherein said preprocessing comprises normalizing pixel data representative of a diffraction band generated through interaction of said sample workpiece and said collimated beam.

6. The apparatus of claim 1, further comprising a telecentric lens disposed between said sample workpiece and said imaging array.

7. An apparatus for determining deviation of characteristics of a sample workpiece from characteristics of a control workpiece, comprising:
   an illumination system for producing a collimated beam having substantially parallel rays;
   a positioning system for placing the sample workpiece between outer edges of said collimated beam to produce a sample image including a silhouette of the sample workpiece;
   an imaging array, normal to said collimated beam and comprising a plurality of discrete light sensing elements, for producing signals corresponding to intensities of pixels of said sample image including said silhouette; and
   a processor for producing pixel data corresponding to said signals and for determining dimensions of the sample workpiece comprising:
   means for detecting a diffraction band produced by edges of said sample workpiece and having an intensity of a diffraction band of a control image produced by edges of a control workpiece of the same type as the sample workpiece;
   means for determining a sample distance between points located within said diffraction band of said sample image;
   means for determining a control distance between corresponding points located within the diffraction band of the control image;
   means for determining an offset between said control distance and a known distance between corresponding points of the control workpiece; and
   means for applying the offset to said sample distance.

* * * * *